Sept. 27, 1927.　　C. F. SHUMAKER　　1,643,525
MACHINE FOR TRIMMING EARS OF CORN
Filed Dec. 30, 1925　　5 Sheets-Sheet 3
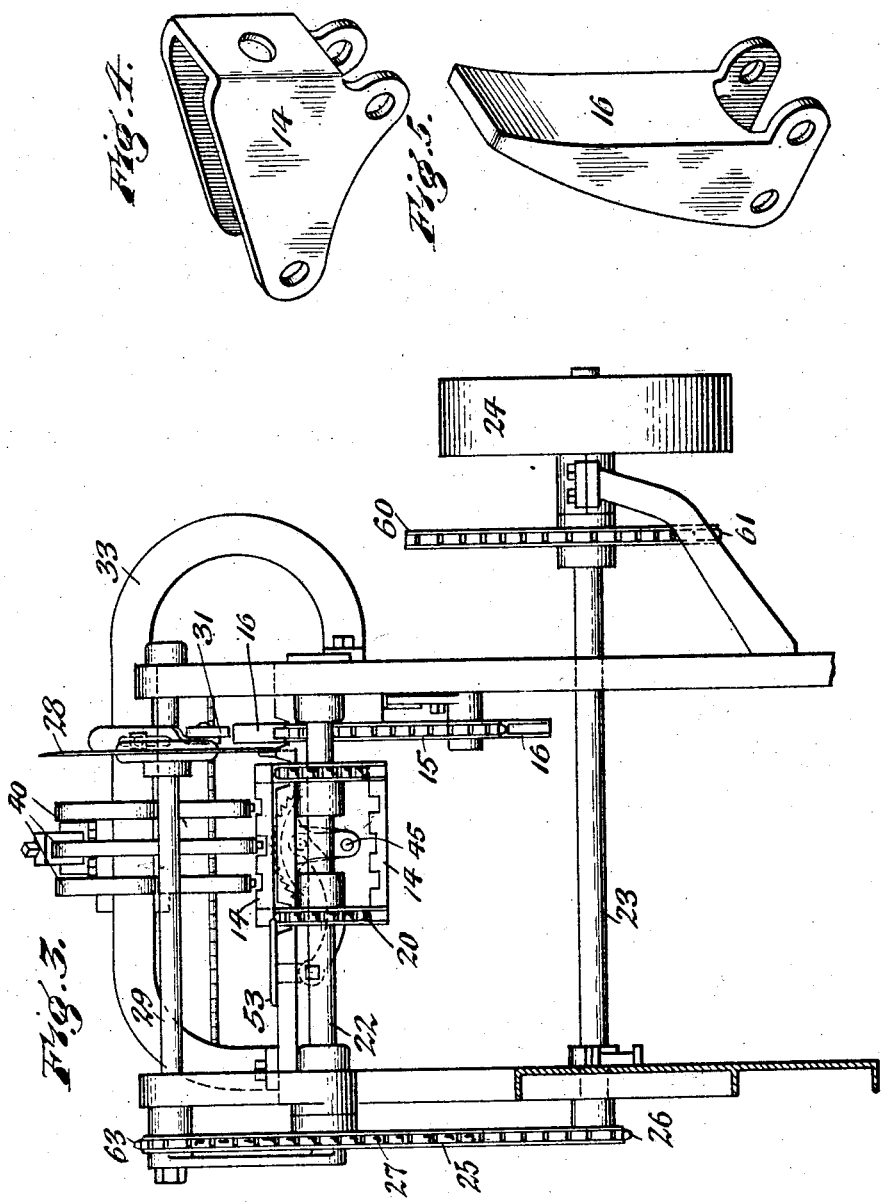

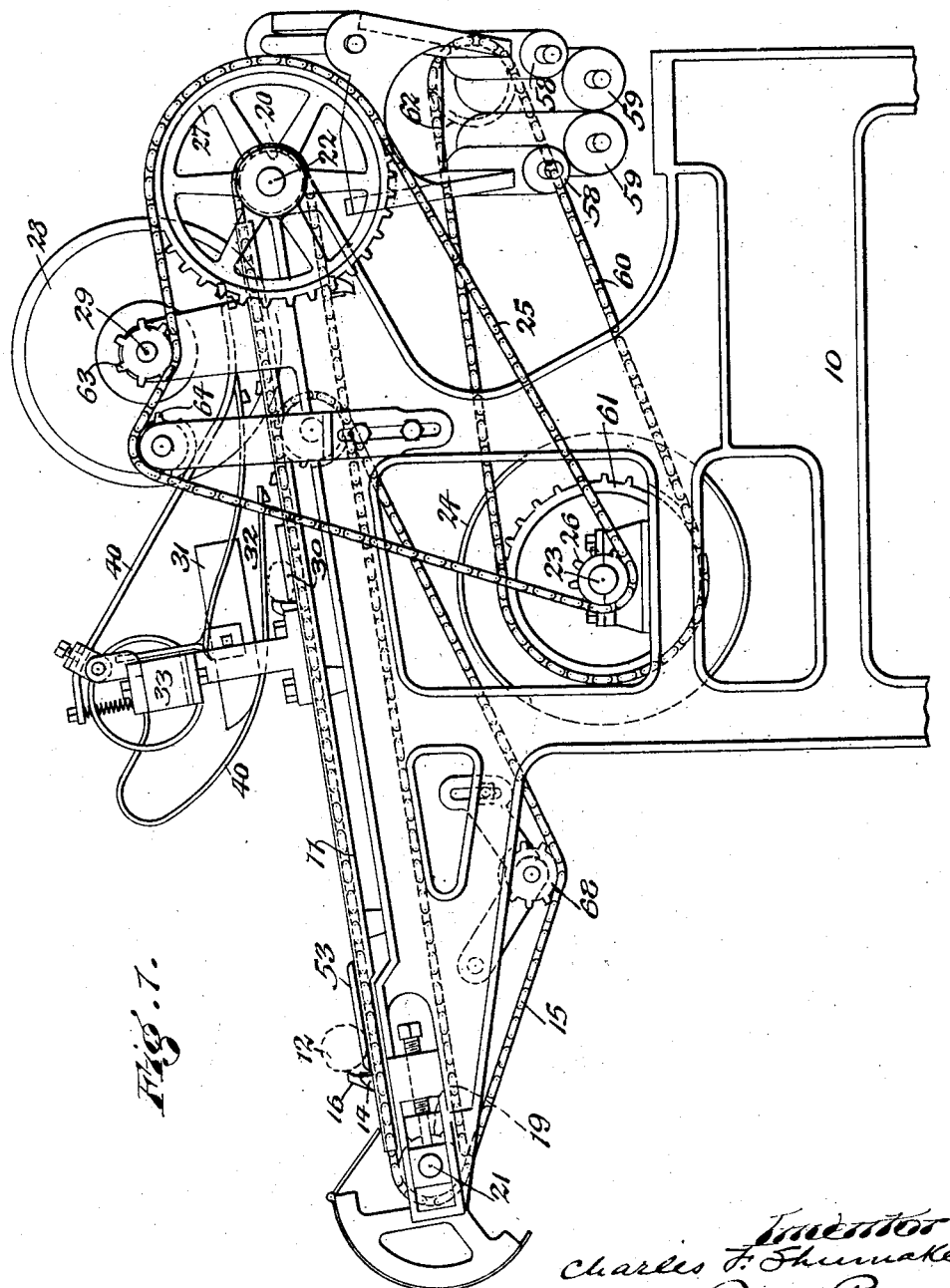

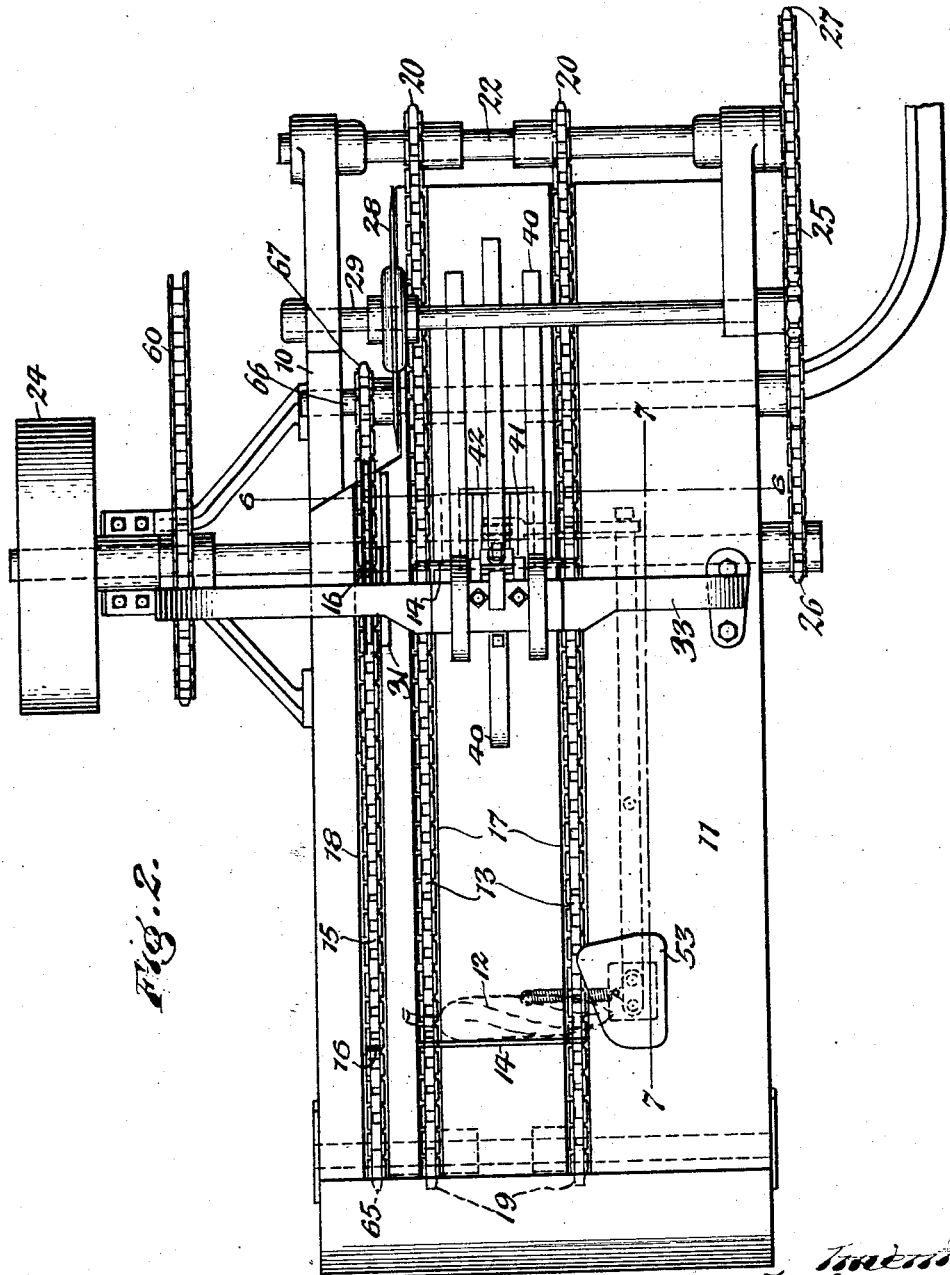

Sept. 27, 1927.

C. F. SHUMAKER 1,643,525

MACHINE FOR TRIMMING EARS OF CORN

Filed Dec. 30, 1925    5 Sheets-Sheet 4

Fig. 6.

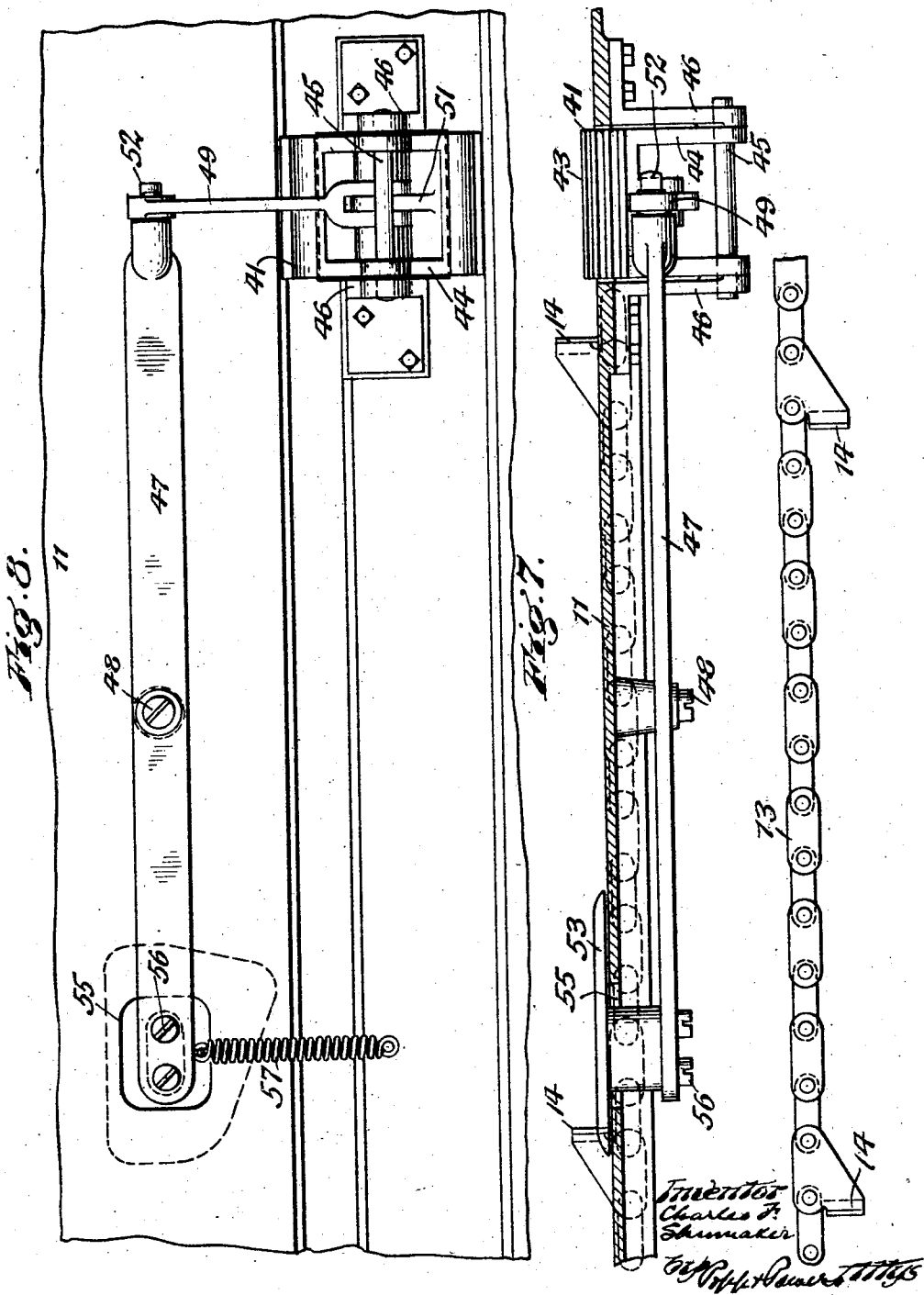

Patented Sept. 27, 1927.

1,643,525

UNITED STATES PATENT OFFICE.

CHARLES F. SHUMAKER, OF SILVER CREEK, NEW YORK, ASSIGNOR TO S. HOWES CO. INC., OF SILVER CREEK, NEW YORK, A CORPORATION OF NEW YORK.

MACHINE FOR TRIMMING EARS OF CORN.

Application filed December 30, 1925. Serial No. 78,431.

This invention relates to a machine for trimming or cutting off the ends of ears of corn preparatory to removing the husks therefrom and cutting the kernels from the cob, such machines being used particularly in canning factories where corn is packed in large quantities for domestic use.

It is the object of this invention to provide a placing mechanism for trimming machines of this character which operates to automatically shift or place the ears of corn in the proper position relative to the cutting device so that the end of the corn next to the butt thereof will be severed properly and permit of more readily removing all of the husks from the ears of corn, which placing mechanism is comparatively simple and durable in construction and positive in its operation and so organized that it will not interfere with the free forward movement of the ears of corn nor perceptibly injure the kernels of the ears.

With this end in view this invention consists generally of a gage, a conveyor whereby the ears of corn are propelled in a crosswise position past the gage, a cutter past which the ears of corn are moved by the conveyor for severing the ends of the ears, and placing means whereby the ears of corn are moved transversely toward the gage before reaching the cutter, which placing means include among other elements a toothed segment gripper which has an oscillating movement toward and from the gage and each tooth having an abrupt front side and an inclined rear side so that each tooth will obtain a reliable hold upon the under side of the corn and move the same positively toward the gage, thereby insuring cutting off the butt end of the corn at the proper place.

In the accompanying drawings:

Figure 1 is a side elevation of a corn husking machine provided in its trimming mechanism with my improved placing device.

Figure 2 is a top plan view of the same.

Figure 3 is a rear end elevation of the machine.

Figure 4 is a perspective view of one of the wings or flights of the main portion of the conveyor which is adapted to engage with the body of the ears of corn for propelling the same.

Figure 5 is a similar view of one of the wings or flights of the side portion of the conveyor whereby those ends of the ears of corn which are cut off by the cutter mechanism are propelled.

Figure 6 is a vertical cross section, on an enlarged scale, taken on line 6—6, Fig. 2.

Figure 7 is a fragmentary vertical longitudinal section, on an enlarged scale, taken on line 7—7, Fig. 2.

Figure 8 is a fragmentary bottom plan view of the ear placing mechanism and the adjacent part of the table over which the ears of corn are moved by the conveyor.

Similar characters of reference indicate like parts throughout the several views of the drawings.

The numeral 10 represents generally the main frame of the machine upon which the several working parts are mounted. On the front part of this main frame is arranged a supporting table 11 over which the ears of corn to be trimmed at the ends are moved toward and from the trimming mechanism. This table is preferably constructed of cast metal and extends lengthwise of the machine and in the preferred construction inclines upwardly from its front or receiving end toward its rear or delivery end, as shown in Fig. 1.

The ears of corn 12 to be trimmed at the ends are placed by the attendant upon the front part of the table and are moved forwardly and lengthwise over the table from the front to the rear end thereof by a conveyor or propeller which may be of any suitable construction but which in the preferred form shown in the drawings comprises two main chain belts 13 which will move with their upper operative stretches lengthwise over the table and are connected by means of main carrying wings or flights 14 adapted to engage with the body portion of the ears of corn and an auxiliary chain belt 15 moving with its upper operative stretch over the side portion of the table and provided at intervals with carrying wings or flights 16 adapted to engage with the butt ends of the ears of corn and move the same forwardly, each main carrying wing 14 being in line with one of the auxiliary carrying wings 16 so that they operate upon the same ear simultaneously. These chain belts preferably run in longitudinal grooves 17, 18 formed in the upper side of the feed or supporting table and pass at their front or receiving turns around receiving sprocket wheels 19 while their rear or delivery turns pass around delivery sprocket wheels 20. The receiving sprocket wheels are mounted upon a horizontal transverse shaft 21 journaled in suitable bearings on the main frame and the delivery sprocket wheels 20 are mounted on the horizontal transverse shaft 22 which is journaled in suitable bearings on the rear part of the main frame.

The driving shaft 23 of the machine is journaled transversely and horizontally in the lower part of the main frame and may be driven in any suitable manner, for instance by means of a driving belt passing around a pulley 24 at one end of the driving shaft. Motion is transmitted from the driving shaft to the chain belts of the conveyor by means of a driving chain 25 passing around a sprocket pinion 26 on the driving shaft and a comparatively large sprocket wheel 27 on one end of the rear sprocket wheel shaft 22.

Adjacent to the delivery end of the conveyor and the feed table and on a line between the main portion of the conveyor and the auxiliary portion thereof is arranged a cutter which is adapted to cut off the butt ends of the ears of corn. In the preferred construction shown in the drawings this cutter is constructed in the form of a circular knife or blade 28 which is arranged in a plane between the left hand side of the main portion of the conveyor and the adjacent portion of the auxiliary portion and is mounted on a horizontal shaft 29 which is arranged transversely above the delivery portion of the feed table and journaled in suitable bearings on the adjacent part of the main frame.

In front of the cutter and a short distance outwardly from the line of cleavage of the cutter is arranged an end gage which in the preferred construction shown in the drawings comprises a lower longitudinal gage bar 30 and an upper longitudinal gage bar 31 which are separated by an intervening longitudinal slot or throat 32. The lower gage bar 30 is mounted on the feed table while the upper gage bar is mounted on an overhanging bridge 33 which forms part of the main frame, the connection between this bridge and the upper gage bar 31 being preferably so constructed that this upper gage bar can rise under an upward pressure and also be adjusted vertically for the purpose of adapting the gage to the size at which the corn runs. For this purpose the upper gage bar 31, as shown in Fig. 6, is mounted on the lower end of the vertical adjusting bar 34 which latter is connected with the free end of a vertically swinging rock arm 35 pivoted by means of a bolt 36 on the bridge 33. The adjustable connection between the shifting bar 34 and the rock arm is effected by means of a bolt 37 passing through the rock arm 35 and a vertical slot 38 in the shifting bar 34. The downward motion of the gage bar 31 is limited by means of a loop 39 which is mounted upon the bridge 33 and receives the free end of the rock arm 35 so as to guide the latter in its vertical movements and also limit the downward motion of the same.

As the ears of corn reach this gage the same are pushed transversely over the feed table and the conveyor so that the stub at one end of the same passed through the slot between the lower and upper gage bars 30, 31 and the breast shoulder or butt of the ears of corn engage at the lower and upper parts thereof with the lower and upper gage bars 30, 31, and after each ear is thus engaged at its butt end the same is continued in its forward movement while arranged in a position crosswise of this longitudinal movement. The propulsion of the ear at this time is effected by the main wings and the main portion of the conveyor engaging with the body of the corn and the engagement of the auxiliary wing of the auxiliary portion of the conveyor engaging with the butt end of the ear of corn whereby the ear is maintained in a transverse position while being moved past the cutter 28, thereby causing the latter to cut the butt or stub end of the corn off square and clean without liability of tipping the ear of corn or producing a ragged or uneven cut.

While the ears are being thus moved transversely toward the gage and lengthwise past the cutter the same are held down by a plurality of retaining springs 40 which are mounted at their front ends on the bridge 33 and project rearwardly and downwardly therefrom so as to maintain the corn in engagement with the feeding wings of the propelling mechanism and ensure proper cutting of the same at the ends thereof.

The improved ear placing device which is incorporated in this machine and which embodies my invention is constructed as follows:

The numeral 41 represents a gripper or jaw having the form of a segment and mounted on the underside of the feed table transversely in line with the end gage of which the bars 30 and 31 form parts. The upper part of this segment gripper projects upwardly through an opening 42 in the central part of the feed table and is provided with a plurality of gripping teeth 43 which are preferably arranged in a row transversely of the machine and each of which extends from the front to the rear edge of the gripper and has an abrupt front side and an inclined rear side so that in effect the same is of substantially ratchet form. An oscillatory movement is imparted to this segment gripper in a direction transversely of the machine and toward and from the end gage, this movement being so timed that the segment gripper is in its retracted position when an ear of corn has been fed forwardly over the same by one of the main conveyor wings 14 and then this segment gripper is moved quickly forward toward the end gage and then is retracted after the ear of corn has been moved with its end against the end gage. During this forward movement the abrupt faces of the uppermost teeth of the gripper engage with the under side of the ear of corn and move the same positively in a direction transversely of the feed table toward the gage until the shoulder or breast thereof at the butt end of the same engages with the gage bars 30, 31. During the return movement the same moves backwardly idly independently of the ear of corn because the latter has been carried by the conveyor forwardly beyond the gripper at this time thereby avoiding disturbing the position of the ear of corn after the same has been gaged so that proper trimming of the butt end thereof by means of the cutter is assured. Although this gripper may be mounted in various way for obtaining this oscillating movement this is preferably accomplished by providing the gripper adjacent to its opposite transverse edges with downwardly projecting supporting rock arms 44 which latter are pivoted at their lower ends by means of a horizontal longitudinal pivot pin 45 on the lower ends of brackets or hangers 46 which depend from the under side of the adjacent part of the feed table in front and in rear of the gripper opening 42, as best shown in Figs. 7 and 8.

A rocking motion is imparted to the gripper in synchronism with the movement of the conveyor by means which are so organized that a positive motion is transmitted from the conveyor to the gripper in the direction for moving the same toward the gage while the return movement of the same away from the gage is of a yielding character. This actuating mechanism for the gripper, as shown in Figs. 1, 2, 3, 6, 7 and 8 is constructed as follows:

The numeral 47 represents an actuating lever which is arranged lengthwise underneath the feed table and pivotally mounted thereon between its front and rear arms by means of a screw 48, as shown in Figs. 7 and 8 or by other suitable means. The rear arm of this actuating lever is operatively connected with the gripper by a link 49 arranged transversely underneath the feed table and pivotally connected at its inner end by a pin 50 with the upper parts of the rock arms 46 and with a pivot lug 51 depending from the gripper between said rock arms while the outer end of this link is connected by means of a pivot pin 52 with the rear end of the actuating lever. The inner end of the link 49 is preferably forked or bifurcated and straddles the pivot lug 51 while the outer end of the same is loosely pivoted on the pivot pin 52 so as to permit of the requisite freedom of motion to permit the actuating lever 47 to swing in one plane and the rocking support of the gripper to swing in another plane.

Above the front part of the table is arranged a tappet or shifting shoe 53 which is preferably constructed in the form of a cam and adapted to be engaged by the carrying wings or flights of the main conveyor and to be deflected thereby which deflecting movement is transmitted to the front arm of the actuating lever 47. For this purpose the tappet 53 is provided with a lug 54 which projects downwardly through an opening 55 in the feed table and connected with the front arm of the actuating lever by means of screws 56, as shown in Figs. 7 and 8 or by other suitable means. The movement of the actuating lever in the opposite direction is effected yieldingly by means of a spring 57 connecting the front arm of this lever with the adjacent part of the table, as shown in Fig. 8. Normally the tappet 53 is drawn inwardly so that it stands in the path of all of the main carrying wings 14 of the conveyor and the placing gripper is retracted, in which position the parts are yieldingly held by means of the resilience of the spring 57. The relative timing of the parts is such that when an ear of corn has been moved forwardly by one of the main wings of the conveyor in line with the end gage, the next following wing 14 will engage with the tappet 53 and move the same out of the path of this wing, whereby the placing gripper will be moved inwardly toward the gage and propel the ear of corn, if one is present at this time, in the same direction for engaging its butt end against the end gage. The instant the respective following main carrying wing 14 has passed forwardly beyond the tappet or trip shoe 53 the latter is again returned to a position in which it stands in the path of the next following main wing to be again deflected thereby, during which return movement the placing gripper is also moved backwardly or away from the end gage preparatory to operating upon the next ear of corn which is to be gaged before being trimmed off at the gaged end thereof.

After this trimming mechanism has operated upon an ear of corn and cut off the butt end thereof the body of the ear is carried forwardly to the rear delivery end of the feed table and to the mechanism whereby the husks are removed from the ear while the butt end which has been severed by the cutter 28 is discharged from the table to a receptacle provided by the same or disposed of in any other suitable manner.

The husking mechanism which removes the husk from the ears of corn forms no part of the present invention and the same is, therefore, merely represented in skeleton form in Fig. 1. The parts of the husking mechanism thereshown comprise two pairs of co-operating husking rollers 58, 59 which are mounted in suitable bearings on the adjacent part of the main frame and turned in the proper direction for effecting the husking of the ears by means which comprise a chain belt 60 passing around a driving sprocket wheel 61 on the driving shaft and a driven sprocket wheel 62 mounted on one of the husking rolls.

In the preferred form of this machine the chain 25 which drives the conveyor belts or chains is also utilized as part of the means for rotating the cutter 28, this being accomplished by passing this chain 25 around a sprocket wheel 63 on one end of the cutter shaft 29 and also around an idle sprocket wheel 64 which is mounted on the adjacent part of the main frame so that a considerable part of the chain belt is wrapped around the cutter sprocket wheel 63, as shown in Fig. 1.

In the most approved form of this machine the upper operative stretch of the slide chain 15 is somewhat shorter than the operative stretches of the main chains 13, 13 and the side chain passes with its front turn around a sprocket wheel 65 on the front shaft 21 and its rear turn passes around a sprocket wheel 67 which is arranged adjacent to the cutter 28 and is mounted on a transverse shaft 66 suitably mounted on the main frame, and its lower return or idle stretch passes around a sprocket wheel 68 which is adjustably mounted in any suitable manner on the lower part of the main frame, as shown in Fig. 1.

The ear placing device forming the subject of this invention is not only very simple in construction but the same is also very efficient in operation and not liable to get out of order by continued use. It also operates upon the ears for engaging the butt ends of the same to be gaged preparatory to the trimming operation without liability of perceptibly injuring the kernels of corn, and the same is also so organized that it is not liable to become clogged and can be easily cleaned and maintained in a sanitary condition.

I claim as my invention:—

1. A machine for trimming the ends of ears of corn, comprising a gage, a conveyor for propelling said ears in a crosswise position past said gage, a cutter which is arranged adjacent to said gage and past which the ears are moved by said conveyor for severing the ends of the ears, and placing means for moving the ears transversely of said conveyor and toward said gage before reaching said cutter comprising a toothed segment gripper turning about a longitudinal horizontal axis and having an oscillating movement toward and from said gage and adapted to engage the underside of the ears of corn.

2. A machine for trimming the ends of ears of corn, comprising a gage, a conveyor for propelling said ears in a crosswise position past said gage, a cutter which is arranged adjacent to said gage and past which the ears are moved by said conveyor for severing the ends of the ears, placing means for moving the ears transversely of said conveyor and toward said gage before reaching said cutter comprising a toothed segment gripper having an oscillating movement toward and from said gage and adapted to engage the underside of the ears of corn and operating means for shifting said gripper by motion derived from said conveyor.

3. A machine for trimming the ends of ears of corn, comprising a table having an opening, a gage arranged adjacent to the table, a conveyor adapted to propel said ears in a crosswise position over said table and past said gage, a cutter which is arranged adjacent to said gage and past which the ears of corn are moved by said conveyor for severing the ends thereof, and placing means for moving the ears transversely toward said gage before reaching said cutter comprising a toothed segment gripper projecting upward through said opening in the table and adapted to engage with the underside of the ears and provided with a downwardly projecting rock arm, a bracket which is mounted on the table and upon which the gripper arm is pivoted to turn about a longitudinal horizontal axis, and means for actuating said gripper so that the same moves toward and from said gage.

4. A machine for trimming the ends of ears of corn, comprising a table having an opening, a gage arranged adjacent to the table, a conveyor adapted to propel said ears in a crosswise position over said table and past said gage, a cutter which is arranged adjacent to said gage and past which the ears of corn are moved by said conveyor for severing the ends thereof, and placing means for moving the ears transversely toward said gage before reaching said cutter comprising a toothed segment gripper projecting upward through said opening in the table and adapted to engage with the underside of the ears and provided with a downwardly projecting rock arm, a bracket which is mounted on the table and upon which the gripper arm is pivoted to turn about a longitudinal horizontal axis, and means for actuating said gripper so that the same moves toward and from said gage, comprising an actuating rock lever arranged underneath the table and turning about a vertical axis, a link connecting the rear end of the actuating lever with the gripper rock arm, and means for operating said lever by motion derived from said conveyor.

5. A machine for trimming the ends of ears of corn, comprising a table having an opening, a gage arranged adjacent to the table, a conveyor adapted to propel said ears in a crosswise position over said table and past said gage, a cutter which is arranged adjacent to said gage and past which the ears of corn are moved by said conveyor for severing the ends thereof, and placing means for moving the ears transversely toward said gage before reaching said cutter comprising a toothed segment gripper projecting upward through said opening in the table and adapted to engage with the under side of the ears and provided with a downwardly projecting rock arm, a bracket which is mounted on the table and upon which the gripper arm is pivoted to turn about a longitudinal horizontal axis, and means for actuating said gripper so that the same moves toward and from said gage comprising an actuating rock lever arranged underneath the table and turning about a vertical axis, a link connecting the rear end of the actuating lever with the gripper rock arm, and means for operating said lever by motion derived from said conveyor, comprising a tappet arranged above the table and connected with the front arm of said lever and adapted to be engaged by a part on said conveyor for moving the gripper toward said gage, and a spring for moving said lever in the direction for carrying said gripper away from said gage.

CHARLES F. SHUMAKER.